J. R. HARBECK.
PACKAGE GUMMING MACHINE.
APPLICATION FILED FEB. 2, 1910.
988,335.
Patented Apr. 4, 1911.
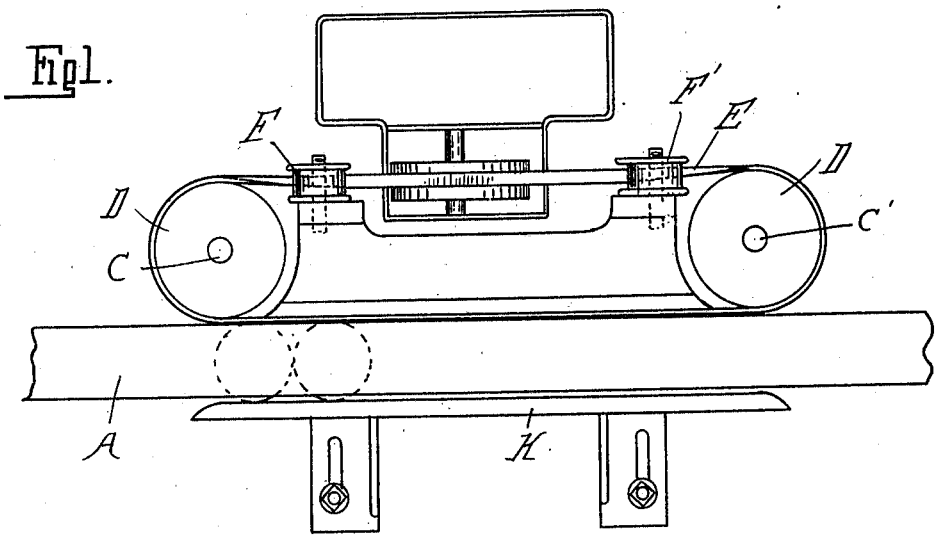
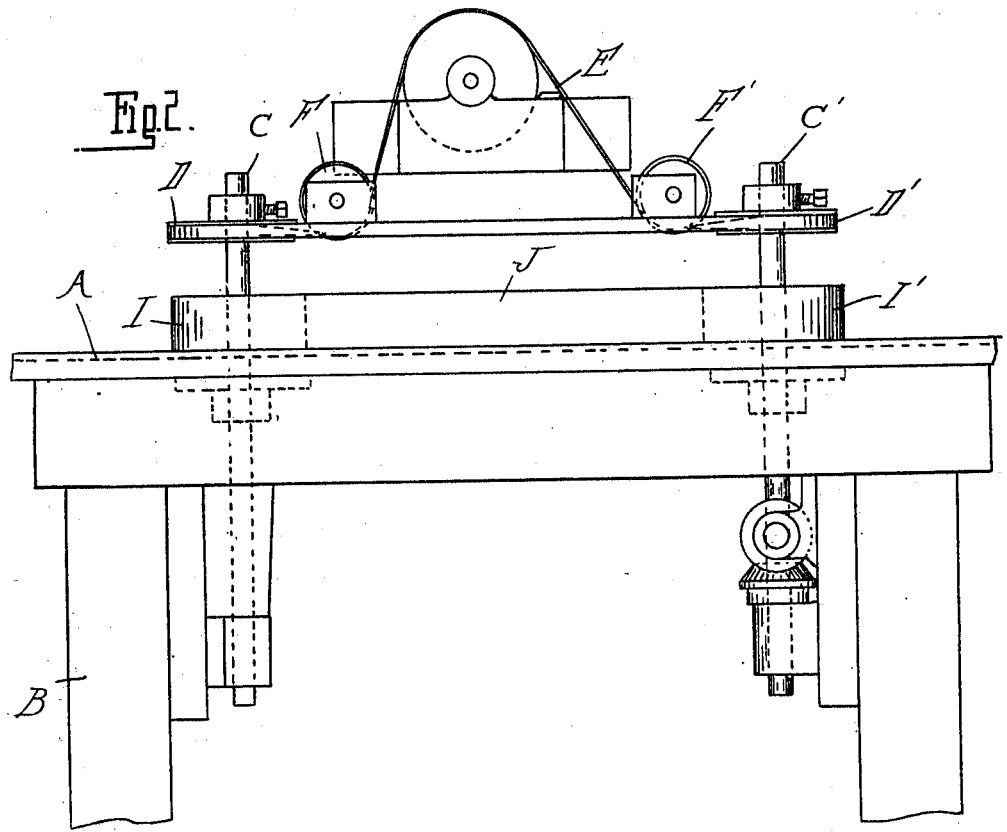
Witnesses
Inventor
Jervis R. Harbeck
By Whittemore Hulbert & Whittemore
attys

UNITED STATES PATENT OFFICE.

JERVIS R. HARBECK, OF DETROIT, MICHIGAN, ASSIGNOR, BY MESNE ASSIGNMENTS, TO DETROIT CAN COMPANY, OF DETROIT, MICHIGAN, A CORPORATION OF NEW JERSEY.

PACKAGE-GUMMING MACHINE.

988,335.  Specification of Letters Patent.  Patented Apr. 4, 1911.

Application filed February 2, 1910. Serial No. 541,635.

*To all whom it may concern:*

Be it known that I, JERVIS R. HARBECK, a citizen of the United States of America, residing at Detroit, in the county of Wayne and State of Michigan, have invented certain new and useful Improvements in Package-Gumming Machines, of which the following is a specification, reference being had therein to the accompanying drawings.

The invention relates to machines for applying adhesive material to packages, and it is the particular object of the invention to obtain a construction in which the filled package may be gummed so that upon the placing of the cap thereon it will be sealed.

The invention consists in the construction as hereinafter set forth.

In the drawings—Figure 1 is a plan view of the machine; and Fig 2 is a side elevation thereof.

My improved construction is more particularly designed for use in connection with apparatus for delivering the filled packages, and the construction is such that packages are automatically gummed during transit. As various sizes of packages may be delivered, the machine is adjustable so as to apply the adhesive at the proper points.

As shown, A is a carrier in the form of an endless belt, which is adapted to constantly deliver the packages from a filling machine (not shown).

B is a suitable framework arranged adjacent to the delivery belt A, upon which is mounted a pair of vertical rotary spindles C C′.

D and D′ are pulleys adjustably secured upon the spindles C C′, and E is a narrow belt passing around the pulleys D D′, and over idler pulleys F F′.

G is a roll partially immersed in a tank H containing the adhesive material.

The arrangement is such that the belt E in traveling will be coated on one side with the adhesive material, and then will pass with its opposite side in contact with the pulleys F F′ D D′. Between the pulleys D D′ the belt E extends in a straight line parallel to the path of the movement of the packages conveyed on the belt A and by properly adjusting the pulleys D D′ on their spindles the belt may be so positioned as to contact with the sides of the packages just below the upper edges thereof. This will apply a narrow strip of the adhesive material, which will seal to the flange of the cap when the latter is placed on the packages.

In order that the adhesive material may be applied to all sides of the packages, it is necessary to revolve the latter as they travel past the belt E. This I preferably accomplish by mounting on the same spindles C C′ pulleys I I′ for a belt J. The spindles are driven at a speed which will drive the belt J at approximately three times the speed of the belt A. K is a stationary guide opposed to the belt J, and adjustable upon the frame B, so that it may be spaced from said belt K, equal to the diameter of the package. Thus as the package enters between the belt J and the guide K, their opposite sides will contact with said members respectively, and during their further movement they will be revolved while still traveling forward at the speed of the belt A. The length of the guide K and belt J is sufficient to cause at least one complete rotation of a package, and consequently the adhesive material on the belt E will be applied completely around the package.

Whenever the size of the package is changed, the pulleys D D′ may be adjusted in position to correspond with the height of the package, the other parts of the mechanism remaining the same. When the packages are delivered from the gumming device, the caps may be placed thereon and will be automatically sealed.

What I claim as my invention is:

1. The combination with a horizontally-traveling carrier, of vertical spindles adjacent said carrier, pulleys upon said spindles, a belt passing about said pulleys and traveling in a vertical plane adjacent to said carrier, a stationary guide on the opposite side of said carrier, pulleys adjustably secured to said spindles, a belt traveling over said adjustable pulleys, and means for applying adhesive material to said belt, for the purpose described.

2. The combination with a horizontal deflecting carrier, of spindles adjacent said carrier, pulleys upon the spindles, a belt passing about said pulleys and traveling in a vertical plane adjacent to the carrier, pulleys adjustably secured to the spindles, and a belt traveling over said adjustable pulleys for the purpose described.

3. The combination with a carrier for advancing a series of upright filled packages, of traveling means for applying an annular strip of adhesive material adjacent to the upper end of the package only for sealing the caps when in place, and means for effecting a complete revolution of the package while in contact with said adhesive applying means.

4. The combination with a carrier for advancing a series of upright filled packages, of a traveling belt for applying an annular strip of adhesive material adjacent the upper end of the package only for sealing the caps when in place, and means for effecting a complete revolution of the package when in contact with said adhesive applying belt.

5. The combination with a carrier for advancing a series of upright filled packages, of a traveling belt for applying an annular strip of adhesive material adjacent the upper end of the package only for sealing the caps when in place, means for effecting a complete revolution of the package when in contact with said adhesive applying belt, and means for adjusting the relative position of the belt to the package.

In testimony whereof I affix my signature in presence of two witnesses.

JERVIS R. HARBECK.

Witnesses:
 NELLIE KINSELLA,
 JAMES P. BARRY.

---

Copies of this patent may be obtained for five cents each, by addressing the "Commissioner of Patents, Washington, D. C."